United States Patent
Avalos Ortiz et al.

(10) Patent No.: US 11,955,781 B2
(45) Date of Patent: Apr. 9, 2024

(54) SWITCHING DEVICE WITH REDUCED PARTIAL DISCHARGE AND IMPROVED TRIPLE POINT CHARACTERISTICS

(71) Applicant: Schneider Electric USA, Inc., Andover, MA (US)

(72) Inventors: Edgar Avalos Ortiz, Murfreesboro, TN (US); Pengkai Han, Xi'an (CN); Francois Gentils, Grenoble (FR); Sergio Flores, Smyrna, TN (US); Matthew Alan Williford, Nashville, TN (US); David Dos Santos, Nashville, TN (US)

(73) Assignee: Schneider Electric USA, Inc., Boston, MA (US)

( * ) Notice: Subject to any disclaimer, the term of this patent is extended or adjusted under 35 U.S.C. 154(b) by 295 days.

(21) Appl. No.: 17/557,225

(22) Filed: Dec. 21, 2021

(65) Prior Publication Data

US 2022/0209514 A1 Jun. 30, 2022

Related U.S. Application Data

(60) Provisional application No. 63/131,412, filed on Dec. 29, 2020.

(51) Int. Cl.
*H02B 11/04* (2006.01)
*H01B 17/56* (2006.01)

(52) U.S. Cl.
CPC ............. *H02B 11/04* (2013.01); *H01B 17/56* (2013.01)

(58) Field of Classification Search
CPC ................................. H02B 11/04; H01B 17/56
See application file for complete search history.

(56) References Cited

U.S. PATENT DOCUMENTS

| 6,433,557 B1 | 8/2002 | Rashkes et al. |
| 8,946,552 B2 | 2/2015 | Li et al. |
| 9,843,170 B2 | 12/2017 | Waynick, Sr. et al. |

(Continued)

FOREIGN PATENT DOCUMENTS

| CN | 101630816 A | 1/2010 |
| EP | 2924703 A1 | 9/2015 |
| JP | 2004222390 A | 8/2004 |

OTHER PUBLICATIONS

Extended European Search Report dated May 13, 2022 for corresponding European Patent Application No. 21214962.9-1201, 10 pages.

(Continued)

*Primary Examiner* — Pete T Lee

(74) *Attorney, Agent, or Firm* — Locke Lord LLP

(57) ABSTRACT

A draw out circuit breaker has a reduced partial discharge in insulation surrounding a primary stab bus. A circular disk plate on one end of the bus includes tapped inserts located at a radial separation distance from the bus. An insulator sleeve surrounding the bus is formed to encapsulate the tapped inserts. Raised embosses on the circular disk plate separate the end portion of the insulator sleeve by a gap distance from the inward facing surface of the disk plate. The increased gap distance reduces formation of a triple point region between the surface of the disk plate and the insulator sleeve, thereby reducing occurrence of partial discharges in the insulator sleeve near the gap.

14 Claims, 7 Drawing Sheets

(56) References Cited

U.S. PATENT DOCUMENTS

| | | | |
|---|---|---|---|
| 10,598,733 B2 | 3/2020 | Giussani et al. | |
| 2008/0230359 A1* | 9/2008 | Leccia | H01H 9/02 |
| | | | 439/157 |
| 2010/0195301 A1* | 8/2010 | Fotherby | H02M 7/003 |
| | | | 361/775 |
| 2012/0071014 A1* | 3/2012 | Dais | H01B 17/28 |
| | | | 439/181 |

OTHER PUBLICATIONS

Faircloth, D. C., "Technological Aspects: High Voltage", Cornell University arXiv:1404.0952, 2014, 39 pages.

Illias, Hazlee et al., "Partial Discharge Patterns in High Voltage Insulation," 2012 IEEE International Conference on Power and Energy (PECon), Dec. 2-5, 2012, Kota Kinabalu Sabah, Malaysia, pp. 750-755, 6 pages.

Illias, Hazlee A. et al., "The influence of spherical cavity surface charge distribution on the sequence of partial discharge events," Journal of Physics D: Applied Physics, vol. 44, No. 24, 2011, 29 pages.

Niemeyer, Lutz, "A Generalized Approach to Partial Discharge Modeling", IEEE transactions on Dielectrics and Electrical Insulation, vol. 2, No. 4, Aug. 1995, pp. 510-528, 20 pages.

Bayer, Christoph Friedrich et al., "Partial Discharges in Ceramic Substrates-Correlation of Electric Field Strength Simulations with Phase Resolved Partial Discharge Measurements", Transactions of the Japan Institute of Electronics Packaging, vol. 9, 2016, 9 pages.

Callender, George et al., "Critical Analysis of Partial Discharge Dynamics in Air Filled Spherical Voids", Journal of Physics D: Applied Physics, vol. 51, No. 12, 2018, 24 pages.

* cited by examiner

SWITCHING DEVICE WITH REDUCED PARTIAL DISCHARGE AND IMPROVED TRIPLE POINT CHARACTERISTICS

CROSS REFERENCE TO RELATED APPLICATIONS

This application claims the benefit of and priority to U.S. Provisional Application No. 63/131,412, filed on Dec. 29, 2020 under 35 U.S.C. 119(e), which application is incorporated by reference herein in its entirety.

TECHNICAL FIELD

The present disclosure relates to reducing the occurrence of partial discharges in insulation to reduce degradation of the insulation over time and avoid potential major equipment damage.

BACKGROUND

Electrical discharges are created in an insulator by imposing an externally applied electric field on the insulator, which is high enough to accelerate the electrons of the insulator to ionization energy that ionizes neutral atoms and molecules of the insulator in an avalanche building process. An insulator that is externally exposed to a very high electric field strength will break down through its bulk in an electrical discharge. However, an insulator that is exposed to a lesser electric field strength may also break down if it contains any gaps. The gaps may have a lower dielectric constant than the dielectric constant of the insulator. This difference in dielectric constants causes the insulator to effectively push the equipotential field lines of the electric field into the space occupied by the gap, causing the field to be concentrated in the gap. This concentrated field will cause the portion of the insulator adjacent to the gap to undergo an electrical discharge. If the breakdown does not reach completely through the bulk of the insulator, then this is referred to as a partial discharge. Partial discharges due to gaps in an insulator may slowly erode the insulator, limiting its useful life.

A triple point occurs where two insulating materials having different dielectric constants are located adjacent to an electrode. Typically, this occurs where there is a gap, such as an air pocket, between an insulator and the electrode. The difference in the dielectric constants between the insulator and the air pocket of the gap results in high electric fields around the triple point. Partial discharge has been shown to occur at such triple points and may lead to accelerated ageing and breakdown of insulator. As the insulator undergoes repeated thermal cycles and mechanical stresses, the problem is exacerbated.

What is needed is an optimized shape and positioning for an electrode at a triple point junction with an insulator to minimize the occurrence of partial discharges in the insulator.

SUMMARY

In accordance with one example embodiment described herein, a draw out circuit breaker has a reduced partial discharge in insulation surrounding a primary stab bus. A circular disk plate on one end of the bus includes tapped inserts located at a radial separation distance from the bus. An insulator sleeve surrounding the bus is formed to encapsulate the tapped inserts. Raised embosses on the circular disk plate separate the end portion of the insulator sleeve by a first gap distance from the inward facing surface of the disk plate. The increased first gap distance reduces formation of a triple point region between the surface of the disk plate and the insulator sleeve, thereby reducing occurrence of partial discharges in the insulator sleeve near the first gap. The encapsulating portions of the insulator sleeve surrounding the inserts have a radially inward-facing surface separated by a second gap distance from the outer cylindrical surface of the conductor. The increased second gap distance reduces formation of a triple point region between the outer cylindrical surface of the conductor and the insulator sleeve, thereby reducing occurrence of partial discharges in the insulator sleeve near the second gap.

The tapped inserts have a rounded head portion mounted on a shaft portion that extends beyond the shaft portion forming a step to reduce a concentration of electric field in the first gap area between the disk plate surface and the insulator sleeve. The circular disk plate has a curved contour or overlap to reduce a concentration of electric field in the first gap area between the disk plate surface and the insulator sleeve. In this manner, the occurrence of partial discharges in the insulator sleeve is minimized.

In accordance with one example embodiment described herein, an apparatus with reduced partial discharge in insulation surrounding a conductor, comprises:
  a circular disk plate with an inward-facing surface placed coaxially on one end of a cylindrical conductor, the disk plate including a plurality of raised embosses formed on the inward facing surface of the disk plate and positioned along a circle coaxial with the conductor, the embosses facing in an inward axial direction from the inward-facing surface of the disk plate, the embosses placed at a radial separation distance from an outer cylindrical surface of the conductor; and
  an insulator sleeve surrounding the conductor, having an annular cross section with a radially inward-facing surface and an end portion flush with the raised embosses on the circular disk plate,
  the end portion of the insulator sleeve having encapsulating portions that encapsulate a plurality of tapped inserts positioned along a circle coaxial with the annular insulator sleeve and aligned with the raised embosses on the circular disk plate,
  each of the tapped inserts of the insulator sleeve abutting a respective one of the raised embosses and fastened thereto by a respective screw to support the circular disk plate and cylindrical conductor in a mutually coaxial configuration with the annular insulator sleeve,
  wherein the raised embosses on the circular disk plate separating the end portion of the insulator sleeve by a first gap distance from the inward facing surface of the disk plate, are configured to reduce formation of a triple point region between the surface of the disk plate and the insulator sleeve, thereby reducing occurrence of partial discharges in the insulator sleeve near the first gap; and
  wherein the encapsulating portions of the insulator sleeve surrounding the inserts having a radially inward-facing surface separated by a second gap distance from the outer cylindrical surface of the conductor, are configured to reduce formation of a triple point region between the outer cylindrical surface of the conductor and the insulator sleeve, thereby reducing occurrence of partial discharges in the insulator sleeve near the second gap.

In accordance with one example embodiment described herein, each of the plurality of inserts is conductive and has a shaft portion with a diameter, the shaft portion abutting the raised emboss on the disk plate, and a rounded head portion coaxially connected to the shaft portion, with an outer diameter of the head portion extending beyond the diameter of the shaft portion forming a step, to reduce a concentration of electric field in the first gap area between the conductor surface of the disk plate and the encapsulating insulator of the insulator sleeve, to thereby reduce occurrence of partial discharges in the encapsulating insulator.

In accordance with one example embodiment described herein, each of the plurality of inserts is molded into the end portion of the insulator sleeve encapsulating each of the plurality of inserts, forming the encapsulating insulator portion having the radially inward-facing surface.

In accordance with one example embodiment described herein, the circular disk plate is conductive has a thickness in the axial direction and a circular outer edge with a curved contour or overlap in a cross section plane parallel with the axis of the conductor, to reduce a concentration of electric field in the gap area between the disk plate the insulator sleeve, to thereby reduce occurrence of partial discharges in the insulator sleeve.

In accordance with one example embodiment described herein, a draw out circuit breaker with reduced partial discharge in insulation surrounding a primary stab bus, comprises:

a circular disk plate with an inward-facing surface placed coaxially on one end of a cylindrical conductor, the disk plate including a plurality of raised embosses formed on the inward facing surface of the disk plate and positioned along a circle coaxial with the conductor, the embosses facing in an inward axial direction from the inward-facing surface of the disk plate, the embosses placed at a radial separation distance from an outer cylindrical surface of the conductor; and an insulator sleeve surrounding the conductor, having an annular cross section with a radially inward-facing surface and an end portion flush with the raised embosses on the circular disk plate, the end portion of the insulator sleeve having encapsulating portions that encapsulate a plurality of tapped inserts positioned along a circle coaxial with the annular insulator sleeve and aligned with the raised embosses on the circular disk plate, each of the tapped inserts of the insulator sleeve abutting a respective one of the raised embosses and fastened thereto by a respective screw to support the circular disk plate and cylindrical conductor in a mutually coaxial configuration with the annular insulator sleeve, wherein the raised embosses on the circular disk plate separating the end portion of the insulator sleeve by a first gap distance from the inward facing surface of the disk plate, are configured to reduce formation of a triple point region between the surface of the disk plate and the insulator sleeve, thereby reducing occurrence of partial discharges in the insulator sleeve near the first gap; and wherein the encapsulating portions of the insulator sleeve surrounding the inserts having a radially inward-facing surface separated by a second gap distance from the outer cylindrical surface of the conductor, are configured to reduce formation of a triple point region between the outer cylindrical surface of the conductor and the insulator sleeve, thereby reducing occurrence of partial discharges in the insulator sleeve near the second gap.

The resulting apparatus and system provide an optimized shape and positioning for an electrode at a triple point junction with an insulator to minimize the occurrence of partial discharges in the insulator.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 4A and 4B further show the circular disk plate formed with its circular outer edge having a curved contour or overlap in a cross section parallel with the axis of the conductor, to reduce a concentration of electric field in the gap area between the disk plate and the insulator sleeve, to thereby reduce occurrence of partial discharges in the insulator sleeve.

Identical reference numerals have been used, where possible, to designate identical elements that are common to the figures. However, elements disclosed in one embodiment may be beneficially utilized on other embodiments without specific recitation.

DETAILED DESCRIPTION

Figure 1A:
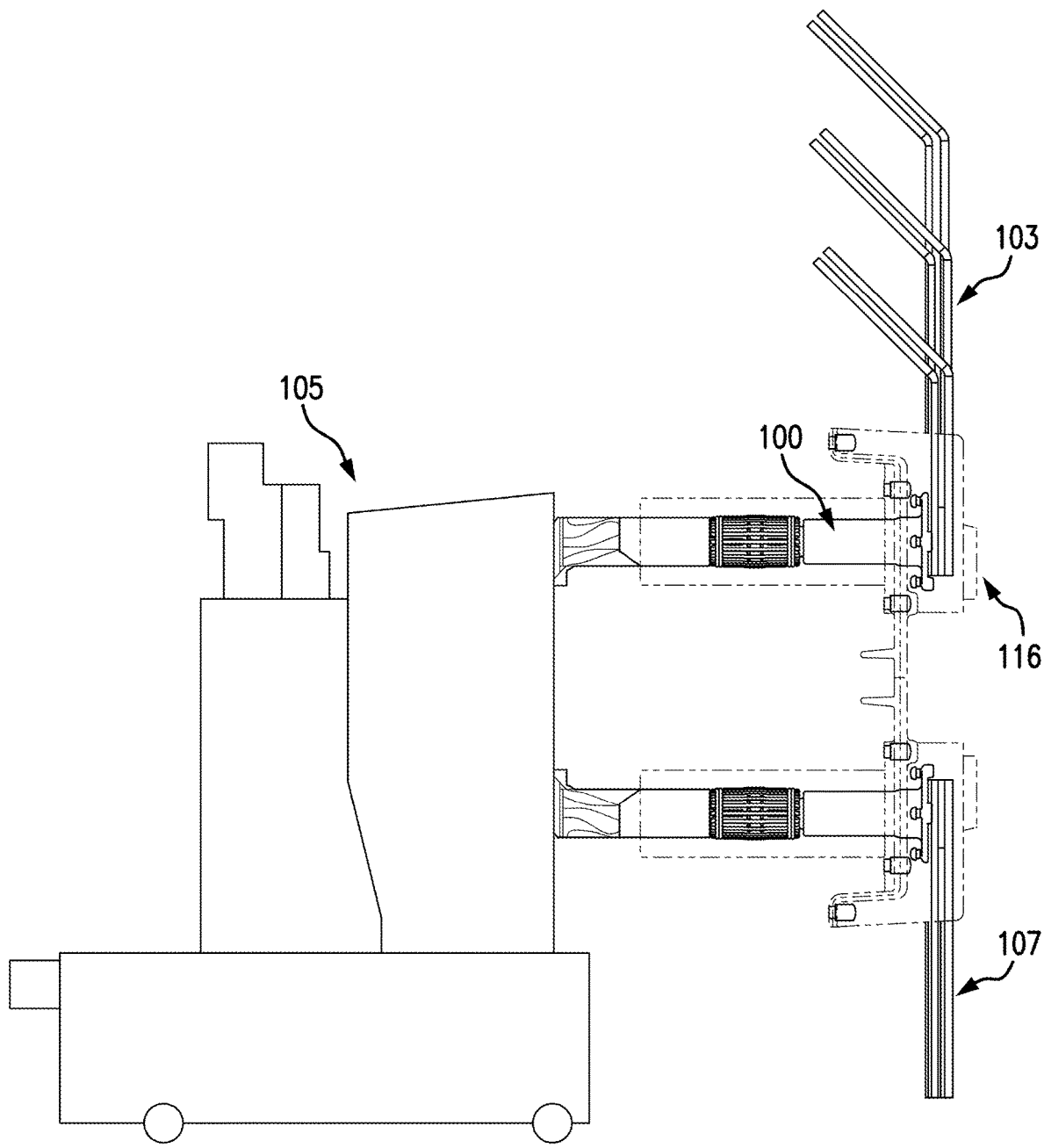
FIG. 1A is an overall view of a medium voltage circuit breaker with a first primary stab bus connected to a riser bus and a second primary stab bus connected to a load bus.
Figure 1B:
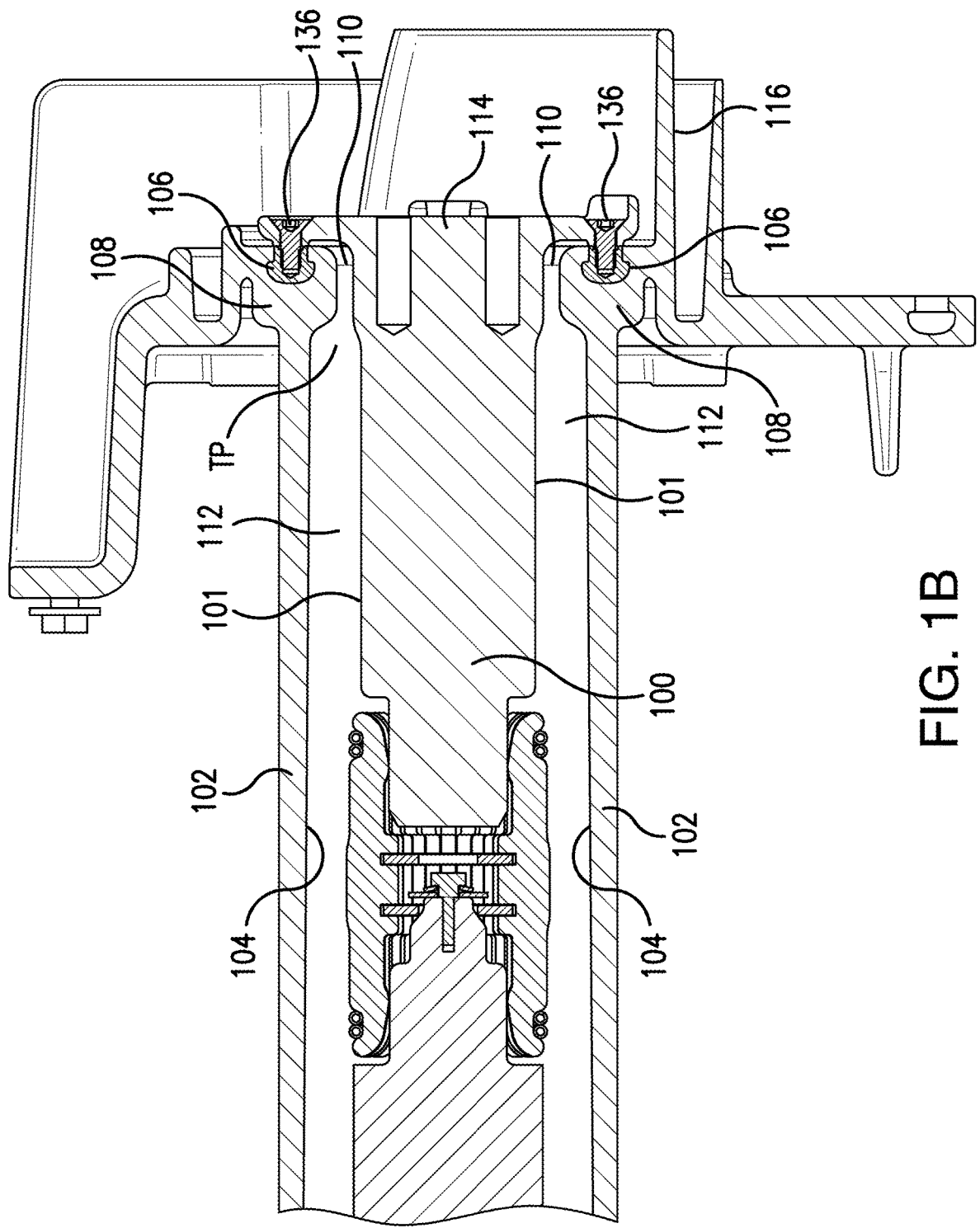
FIG. 1B is a side, cross sectional view of the primary stab bus for the medium voltage circuit breaker of FIG. 1A.

FIG. 1A is an overall view of a medium voltage circuit breaker 105 with a first primary stab bus 100 connected to a riser bus 103 and a second primary stab bus connected to a load bus 107. A medium voltage circuit breaker may have a rated maximum voltage of, for example, from 5 to 15 kV, a rated continuous current of, for example, from 1200 to 2000 Amperes, and a rated power frequency of, for example, 60 Hz. A finger cluster is shown electrically connecting the conductor or primary stab bus 100 to a runback conductor that connects to the main contacts of the circuit breaker. The primary stab bus 100 is a cylindrical conductor that may be cast as a single piece with a circular disk plate 114 (FIG. 1B). The circular disk plate is electrically connected to the riser bus 103 to provide power to the circuit breaker. The annular insulator sleeve 102 and the insulating bushing 116 may be formed as a single piece insulator that may be fastened by a structural fastener (FIG. 1B) to an external support structure. The insulator sleeve 102 abuts with and is fastened to the circular disk plate 114 (FIGS. 1B and 1C) to support the circular disk plate 114 and the cylindrical conductor 100 in a mutually coaxial configuration with the annular insulator sleeve 102.

FIG. 1B is a side, cross sectional view of the cylindrical, current carrying conductor or primary stab bus 100, illustrating an embodiment for reducing partial discharge in the insulator sleeve 102 surrounding the conductor 100. An air gap 112 separates the conductor 100 and the insulator sleeve 102. The circular disk plate 114 has an inward-facing surface coaxially located on one end of the cylindrical conductor 100. The insulator sleeve 102 and bushing 116 include a plurality of tapped inserts 106 that abut with the raised embosses 142 (FIG. 1C) of the circular disk plate 114. The raised embosses 142 are formed on an inward facing surface of the circular disk plate 114 and positioned along a circle coaxial with the conductor 100. The raised embosses 142 are formed on the circular disk plate at a radial separation distance from an outer cylindrical surface 101 of the conductor 100. A screw 136 fastens each tapped insert 106 to the disk plate 114.

The insulator sleeve 102 surrounding the conductor 100 has an annular cross section with a radially inward-facing surface 104 and an end surface abutted to the raised embosses 142 on the inward-facing surface of the disk plate 114. The end surface of the insulator sleeve 102 is molded around the head 132 (FIG. 3) of each insert 106 as an encapsulating insulator 108 for each respective insert 106.

The rated insulation voltage withstand for insulation in a medium voltage circuit breaker may be, for example, from 19 to 38 kV. Example compositions of the insulator sleeve 102 may be, for example, glass reinforced polyester or cycloaliphatic epoxy resin. The dielectric constant of glass reinforced polyester at 60 Hz is approximately 4.30. The dielectric constant of cycloaliphatic epoxy resin at 60 Hz is approximately 3.0. By comparison, the dielectric constant of a gap, such as an air pocket, is approximately 1.0. A triple point occurs where two insulating materials having different dielectric constants are located adjacent to an electrode. Typically, this occurs where there is a gap, such as an air pocket, between an insulator and the electrode. The difference in the dielectric constants between the insulator and the air pocket of the gap results in high electric fields around the triple point. Partial discharge in adjacent insulators has been shown to occur at such triple points and may lead to accelerated ageing and breakdown of insulator.

To reduce the occurrence of partial discharges in the insulator sleeve, example embodiments increase gap distances between the insulator surfaces and the conductor surfaces to reduce formation of a triple point region. The inserts 106 position the disk plate 114 against the encapsulating insulator 108 so as to be separated by a minimal distance, for example of at least 4 millimeters, from the outer cylindrical surface 101 of the conductor 100, to increase a radial thickness of gap area 110. This reduces the chance of forming a triple point region TP between the conductor surface 101 and encapsulating insulator 108, to thereby reduce occurrence of partial discharges in the encapsulating layer 108 of the insulating sleeve 102.

Figure 1C:
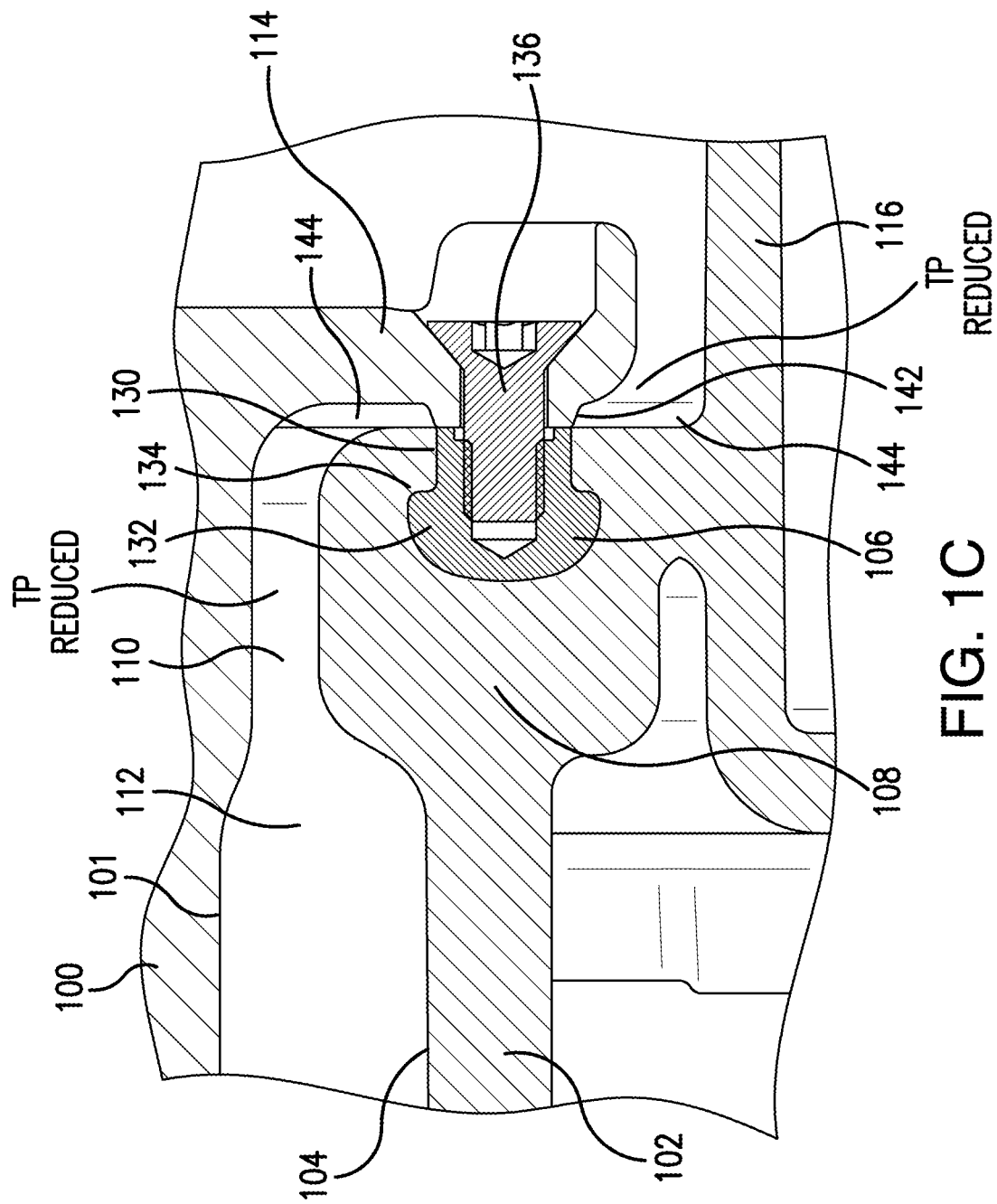
FIG. 1C is a magnified view of the primary stab bus of FIG. 1B, illustrating an embodiment for reducing partial discharge in an insulator sleeve surrounding the bus.

FIG. 1C is a magnified view of the primary stab bus conductor 100 of FIG. 1B, illustrating an embodiment for reducing partial discharge in the insulator sleeve 102 surrounding the conductor 100. The circular disk plate 114 has an inward-facing surface placed coaxially on one end of the cylindrical conductor 100. The disk plate 114 includes a plurality of raised embosses 142 formed on the inward facing surface of the disk plate 114 and positioned along a circle coaxial with the conductor 100, the embosses 142 facing in an inward axial direction from the inward-facing surface of the disk plate 114. The embosses are placed at a radial separation distance from an outer cylindrical surface of the conductor 100.

The insulator sleeve 102 surrounding the conductor 100, has an annular cross section with a radially inward-facing surface 104 and an end portion flush with the raised embosses 142 on the circular disk plate 114.

The end portion of the insulator sleeve 102 has encapsulating portions 108 that encapsulate the plurality of tapped inserts 106 positioned along a circle coaxial with the annular insulator sleeve 102 and aligned with the raised embosses 142 on the circular disk plate 114.

Each of the tapped inserts 106 of the insulator sleeve 102 abuts a respective one of the raised embosses 142 and is fastened thereto by a respective screw 136 to support the circular disk plate 114 and cylindrical conductor 100 in a mutually coaxial configuration with the annular insulator sleeve 102.

The raised embosses 142 on the circular disk plate 114 separate the end portion of the insulator sleeve 102 by a first gap distance 144 from the inward facing surface of the disk plate 114. The raised embosses 142 are configured to reduce formation of a triple point region TP between the surface of the disk plate 114 and the insulator sleeve 102, thereby reducing occurrence of partial discharges in the insulator sleeve 102 near the first gap 144. In example embodiments, by increasing the gap distance, the gradient in voltage may be reduced in at least one of the first gap area 144 or the second gap area 110, the occurrence of partial discharges may be reduced in the insulator sleeve near the first gap or the second gap. In example applications with particular differences in conductor voltages and particular insulator compositions, values for the voltage gradient of less than 14 kV per millimeter may reduce the occurrence of partial discharges in the insulator.

The encapsulating portions 108 of the insulator sleeve 102 surrounding the inserts 106 have a radially inward-facing surface separated by a second gap distance 110 from the outer cylindrical surface 101 of the conductor 100. The second gap distance 110 is established by the alignment of the tapped inserts 106 with the raised embosses 142 on the circular disk plate 114. The second gap distance 110 is configured to reduce formation of a triple point region TP between the outer cylindrical surface 101 of the conductor 100 and the insulator sleeve 102, thereby reducing occurrence of partial discharges in the insulator sleeve 102 near the second gap 110.

Each of the plurality of inserts 106 is conductive and has a shaft portion 130 with a diameter, the shaft portion 130 abutting the raised emboss 142 on the disk plate 114, and a rounded head portion 132 coaxially connected to the shaft portion 130, with an outer diameter of the head portion 132 extending beyond the diameter of the shaft portion 130 forming a step 134, to reduce a concentration of electric field in the first gap area 144 between the conductor surface of the disk plate 114 and the encapsulating insulator 108 of the insulator sleeve 102, to thereby reduce occurrence of partial discharges in the encapsulating insulator 108.

Figure 2:
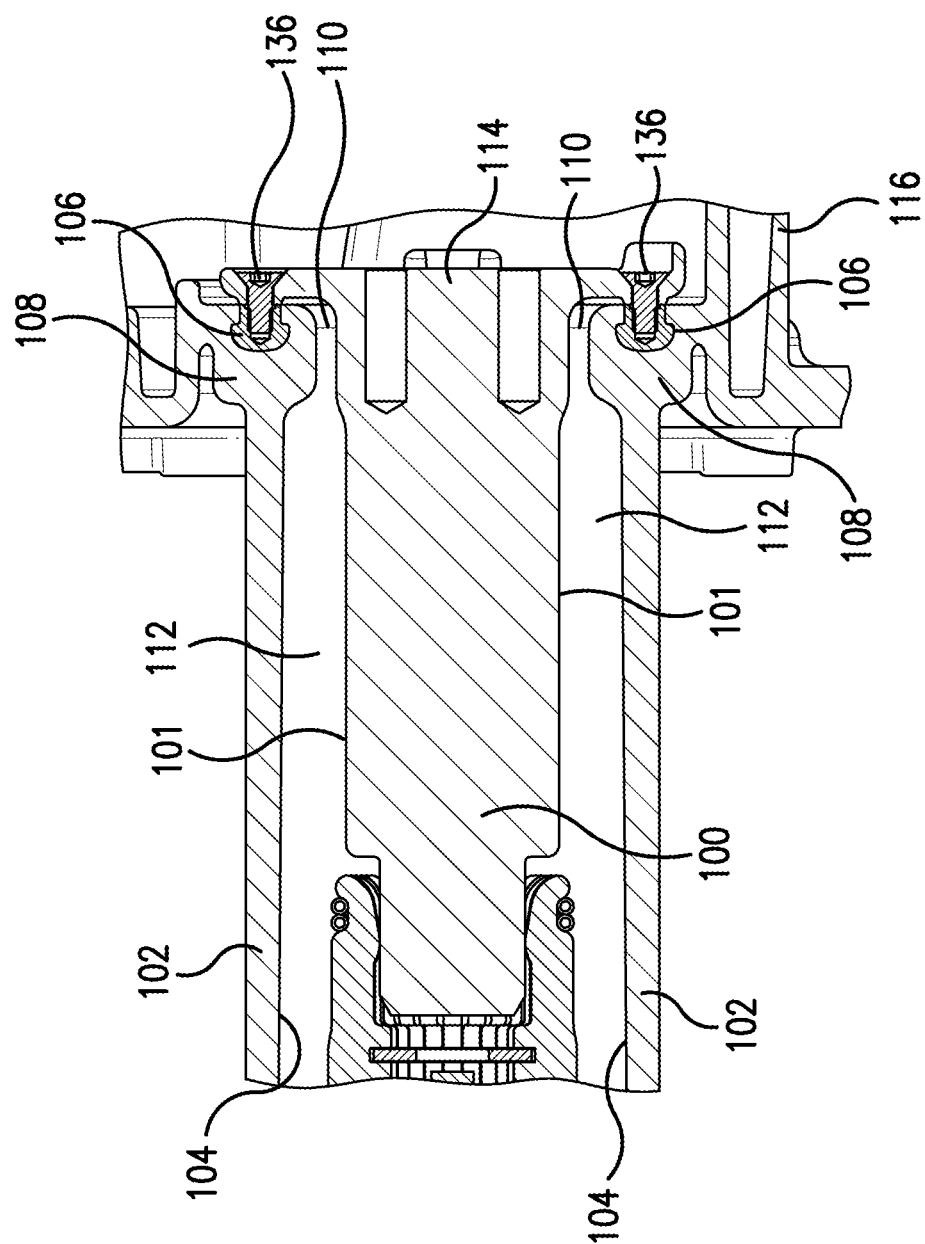
FIG. 2 is a side view of the primary stab bus and insulator sleeve of FIG. 1, illustrating an annular cross section of the insulator sleeve with the inserts molded in the insulator sleeve and the disk plate mounted on the inserts with screws.

FIG. 2 is a side view of the cylindrical, current carrying conductor or primary stab bus 100 and insulator sleeve 102 of FIG. 1B, illustrating the annular cross section of the insulator sleeve 102 with the plurality of encapsulating insulators 108 on the end surface of the insulator sleeve 102 respectively molded over the corresponding plurality of inserts 106.

Figure 3:
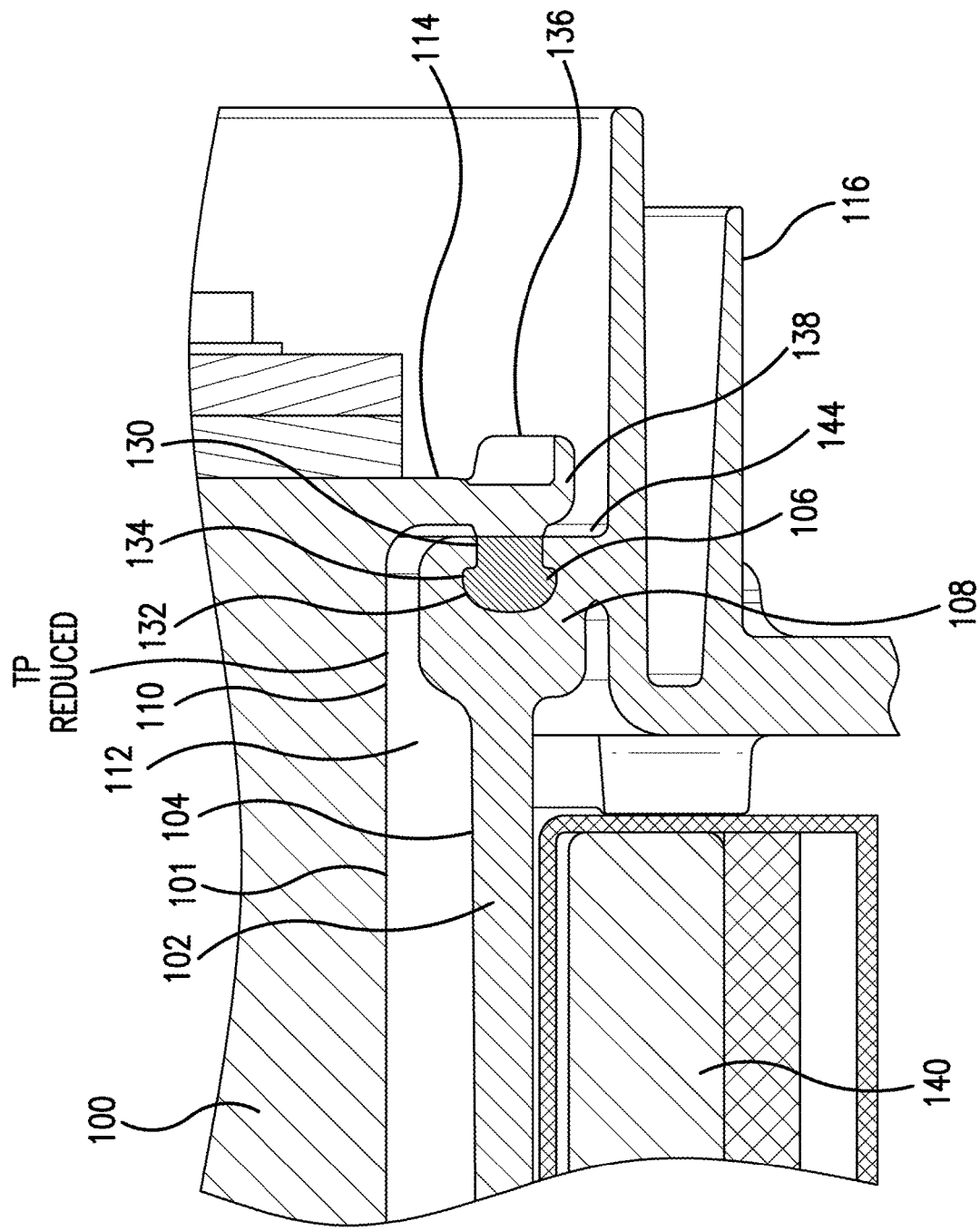
FIG. 3 illustrates the inserts on the insulator sleeve positioning the circular disk plate to be separated by at least a minimum distance from the outer cylindrical surface of the conductor, to increase a gap area between the conductor surface and the insulator sleeve, to thereby reduce occurrence of partial discharges in the insulator sleeve. The figure further shows the circular disk plate has a thickness in the axial direction and a circular outer edge with a curved contour or overlap in a cross section parallel with the axis of the conductor, to reduce a concentration of electric field in the gap area between the disk plate and the insulator sleeve, to thereby reduce occurrence of partial discharges in the insulator sleeve.

FIG. 3 illustrates the inserts 106 abutting the raised embosses of the disk plate 114 that position the radially inward-facing surface 104 of the encapsulating layer 108 to be separated by a minimal distance, for example of at least 4 millimeters, from the outer cylindrical surface 101 of the conductor 100. In this manner, a radial thickness of gap area 110 is increased between the conductor surface 101 and encapsulating insulator 108, reducing the chances of forming a triple point region TP, to thereby reduce occurrence of partial discharges in the encapsulating insulator 108 of the insulator sleeve 102.

FIG. 3 further shows the circular disk plate 114 has a thickness in the axial direction and a circular outer edge with a curved contour or overlap 138 in a cross section parallel with the axis of the conductor 100. Generally, an electric field increases in strength as the radius of curvature decreases at a junction of a conductor and an insulator. The smoothly curved contour or overlap 138 of the disk plate 114 reduces the concentration of the electric field in the gap area 144 between the disk plate 114 and the encapsulating insulator 108 of the insulator sleeve 102, to thereby reduce occurrence of partial discharges in the encapsulating insulator 108 of the insulator sleeve 102.

FIG. 3 also shows each of the plurality of inserts 106 has a shaft portion 130 with a diameter, the shaft portion abutting the raised emboss 142 (FIG. 1C) of the disk plate 114, and a rounded head portion 132 coaxially mounted on the shaft portion 130, with an outer diameter of the head portion 132 extending beyond the diameter of the shaft portion 130 forming a step 134. In this manner, the concentration is reduced of the electric field in the gap area 144 between the disk plate 114 and the encapsulating insulator 108 of the insulator sleeve 102, to thereby reduce occurrence of partial discharges in the encapsulating insulator 108 of the insulator sleeve 102.

FIG. 3 also shows the current transformer coil 140 that may be operated at a much lower voltage that the voltage carried by the primary bus conductor 100. The end of the coil 140, which is proximate to the encapsulating insulator portion 108 of the insulator sleeve 102, has a position that is separated by a minimal distance, for example of at least 12 millimeters, from the encapsulating insulator portion 108 of the insulator sleeve 102. In this manner, an occurrence of partial discharges is reduced in the insulator sleeve.

Figure 4:
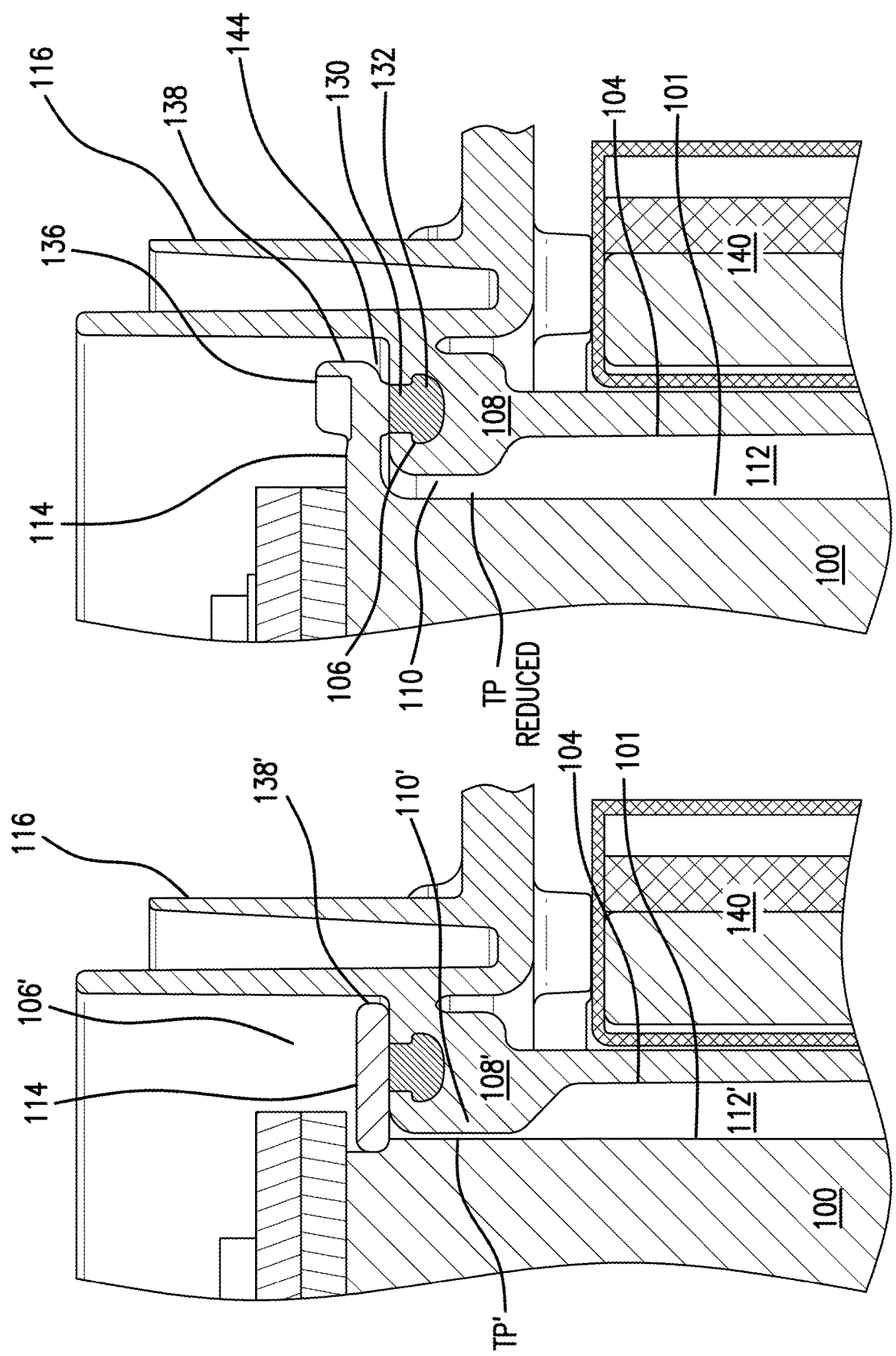
FIGS. 4A and 4B compare changes made by the embodiment on the primary bus conductor with its disk plate and the insulator sleeve, increasing the separation distance of the insulator sleeve from the outer cylindrical surface of the conductor in the vicinity of the inserts, to increase the gap area between the conductor surface and the insulator sleeve, to thereby reduce occurrence of partial discharges in the insulator sleeve.

FIGS. 4A and 4B compare changes made by the embodiment on the primary bus conductor 100 with its disk plate 114 and the insulator sleeve 102. The gap 110 distance is increased in the vicinity of the insert 106. The smaller thickness of the gap area 110' in FIG. 4A adversely increases the incidence of partial discharge occurring in the triple point TP' region between the conductor surface 101 and the encapsulating insulator 108'. By comparison, in the embodiment disclosed herein, the thickness is increased for the gap area 110 in FIG. 4B, which decreases the incidence of partial discharge occurring in the triple point TP region between the conductor surface 101 and the encapsulating insulator 108. In this manner, the occurrence of partial discharges is reduced in the insulator sleeve.

FIGS. 4A and 4B further show the circular disk plate 114 is changed in the embodiment, from the flat edge 138' in FIG. 4A to the overlap contour of the edge 138 shown in FIG. 4B, with its circular outer edge having a curved contour in a cross section plane parallel with the axis of the conductor 100. In this manner, the concentration is reduced of the electric field in the gap area 144 between the disk plate 114 and the encapsulating insulator 108 of the insulator sleeve, to thereby reduce occurrence of partial discharges in the encapsulating insulator 108 of the insulator sleeve 102.

Figure 5:
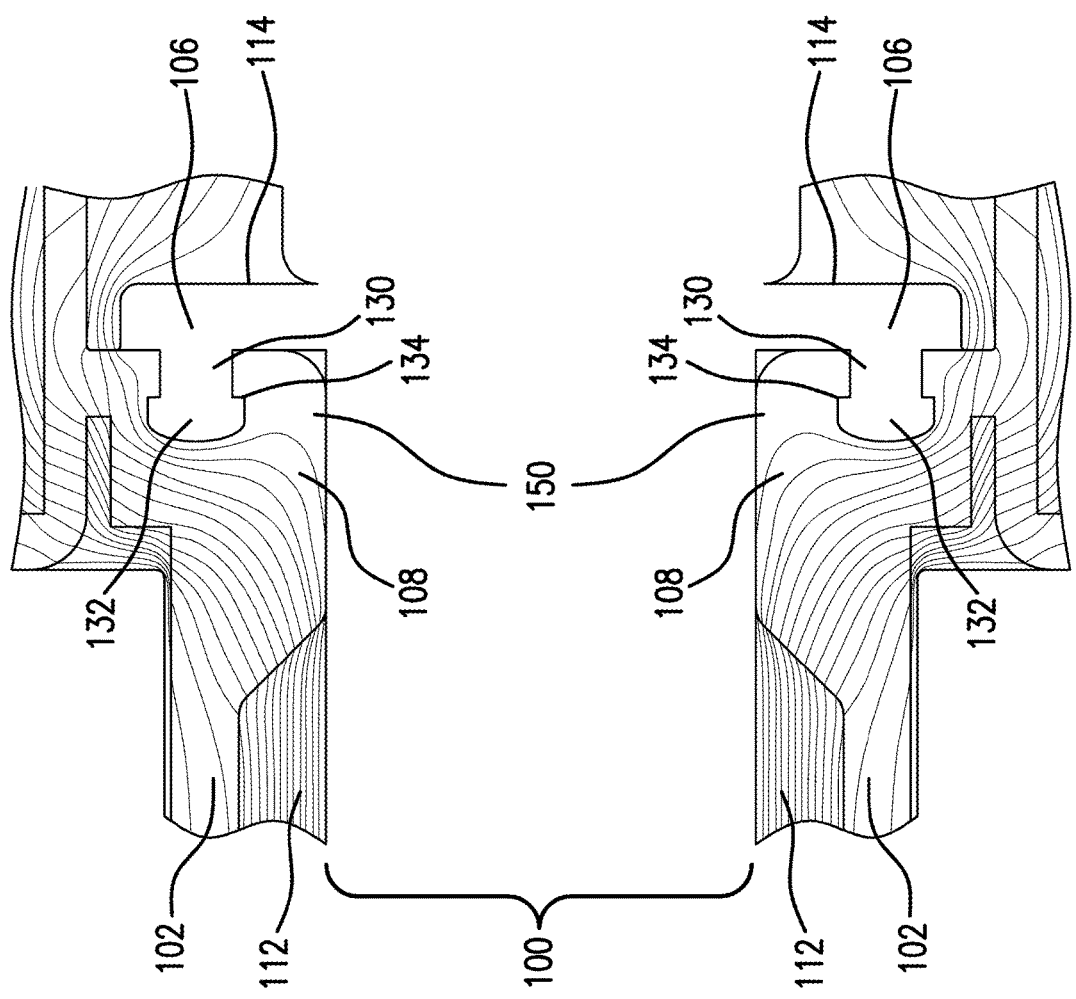
FIG. 5 illustrates each of the plurality of inserts is conductive and has a shaft portion with a diameter, the shaft portion mounted to the inward-facing surface of the disk plate, and a rounded head portion coaxially mounted on the shaft portion, with an outer diameter of the head portion extending beyond the diameter of the shaft portion forming a step, to reduce a concentration of electric field in the portion of the encapsulating insulator between the insert and the primary bus conductor near to where it joins the circular disk plate, to thereby reduce occurrence of partial discharges in the encapsulating insulator.

FIG. 5 illustrates each of the plurality of inserts 106 is conductive and has a shaft portion 130 with a diameter, the shaft portion 130 mounted to the inward-facing surface of the disk plate 114, and a rounded head portion 132 coaxially mounted on the shaft portion 130, with an outer diameter of the head portion 132 extending beyond the diameter of the shaft portion 130 forming a step 134, to reduce a concentration of electric field in a region 150 of the encapsulating insulator 108 between the insert 106 and the primary bus conductor 100 near to where the bus conductor 100 joins the circular disk plate 114, to thereby reduce occurrence of partial discharges in the encapsulating insulator 108.

The resulting apparatus and system provide an optimized shape for the electrode at its junction with the insulator to minimize any triple point dielectric field and to provide improved triple point characteristics.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus with reduced partial discharge in insulation surrounding a conductor, comprising:
   a circular disk plate with an inward-facing surface placed coaxially on one end of a cylindrical conductor, the disk plate including a plurality of raised embosses formed on the inward facing surface of the disk plate and positioned along a circle coaxial with the conductor, the embosses facing in an inward axial direction from the inward-facing surface of the disk plate, the embosses placed at a radial separation distance from an outer cylindrical surface of the conductor; and
   an insulator sleeve surrounding the conductor, having an annular cross section with a radially inward-facing surface and an end portion flush with the raised embosses on the circular disk plate, the end portion of the insulator sleeve having encapsulating portions that encapsulate a plurality of tapped inserts positioned along a circle coaxial with the annular insulator sleeve and aligned with the raised embosses on the circular disk plate, each of the tapped inserts of the insulator sleeve abutting a respective one of the raised embosses and fastened thereto by a respective screw to support the circular disk plate and cylindrical conductor in a mutually coaxial configuration with the annular insulator sleeve,
   wherein the raised embosses on the circular disk plate separating the end portion of the insulator sleeve by a first gap distance from the inward facing surface of the disk plate, are configured to reduce formation of a triple point region between the surface of the disk plate and the insulator sleeve, thereby reducing occurrence of partial discharges in the insulator sleeve near the first gap; and
   wherein the encapsulating portions of the insulator sleeve surrounding the inserts having a radially inward-facing surface separated by a second gap distance from the outer cylindrical surface of the conductor, are configured to reduce formation of a triple point region between the outer cylindrical surface of the conductor and the insulator sleeve, thereby reducing occurrence of partial discharges in the insulator sleeve near the second gap.

2. The apparatus of claim 1, wherein each of the plurality of inserts is conductive and has a shaft portion with a diameter, the shaft portion abutting the raised emboss on the disk plate, and a rounded head portion coaxially connected to the shaft portion, with an outer diameter of the head portion extending beyond the diameter of the shaft portion forming a step, to reduce a concentration of electric field in the first gap area between the conductor surface of the disk plate and the encapsulating insulator of the insulator sleeve, to thereby reduce occurrence of partial discharges in the encapsulating insulator.

3. The apparatus of claim 1, wherein each of the plurality of inserts is molded into the end portion of the insulator sleeve encapsulating each of the plurality of inserts, forming the encapsulating insulator portion having the radially inward-facing surface.

4. The apparatus of claim 2, wherein the shaft portion of each of the plurality of inserts is fastened by a screw to the disk plate to support the disk plate on the insulator.

5. The apparatus of claim 1, wherein the circular disk plate is conductive has a thickness in the axial direction and a circular outer edge with a curved contour or overlap in a cross section plane parallel with the axis of the conductor, to reduce a concentration of electric field in the gap area between the conductor surface of the disk plate and the encapsulating insulator of the insulator sleeve, to thereby reduce occurrence of partial discharges in the encapsulating insulator.

6. The apparatus of claim 1, wherein an end of a current transformer coil surrounding the conductor, which is proximate to the encapsulating insulator portion of the insulator sleeve, has a location separated by at least a minimum distance from the encapsulating insulator portion of the insulator sleeve, to thereby reduce occurrence of partial discharges in the insulator sleeve.

7. The apparatus of claim 1, wherein a gradient in voltage in at least one of the first gap area or the second gap area is less than 14 kV per millimeter, thereby reducing occurrence of partial discharges in the insulator sleeve near the first gap or the second gap.

8. A draw out circuit breaker with reduced partial discharge in insulation surrounding a primary stab bus, comprising:
   a circular disk plate with an inward-facing surface placed coaxially on one end of a cylindrical conductor, the disk plate including a plurality of raised embosses formed on the inward facing surface of the disk plate and positioned along a circle coaxial with the conductor, the embosses facing in an inward axial direction from the inward-facing surface of the disk plate, the embosses placed at a radial separation distance from an outer cylindrical surface of the conductor; and
   an insulator sleeve surrounding the conductor, having an annular cross section with a radially inward-facing surface and an end portion flush with the raised embosses on the circular disk plate, the end portion of the insulator sleeve having encapsulating portions that encapsulate a plurality of tapped inserts positioned along a circle coaxial with the annular insulator sleeve and aligned with the raised embosses on the circular disk plate, each of the tapped inserts of the insulator sleeve abutting a respective one of the raised embosses and fastened thereto by a respective screw to support the circular disk plate and cylindrical conductor in a mutually coaxial configuration with the annular insulator sleeve,
   wherein the raised embosses on the circular disk plate separating the end portion of the insulator sleeve by a first gap distance from the inward facing surface of the disk plate, are configured to reduce formation of a triple point region between the surface of the disk plate and the insulator sleeve, thereby reducing occurrence of partial discharges in the insulator sleeve near the first gap; and
   wherein the encapsulating portions of the insulator sleeve surrounding the inserts having a radially inward-facing surface separated by a second gap distance from the outer cylindrical surface of the conductor, are configured to reduce formation of a triple point region between the outer cylindrical surface of the conductor and the insulator sleeve, thereby reducing occurrence of partial discharges in the insulator sleeve near the second gap.

9. The draw out circuit breaker of claim 8, wherein each of the plurality of inserts is conductive and has a shaft portion with a diameter, the shaft portion abutting the raised emboss on the disk plate, and a rounded head portion coaxially connected to the shaft portion, with an outer diameter of the head portion extending beyond the diameter of the shaft portion forming a step, to reduce a concentration of electric field in the first gap area between the conductor surface of the disk plate and the encapsulating insulator of the insulator sleeve, to thereby reduce occurrence of partial discharges in the encapsulating insulator.

10. The draw out circuit breaker of claim 8, wherein each of the plurality of inserts is molded into the end portion of the insulator sleeve encapsulating each of the plurality of inserts, forming the encapsulating insulator portion having the radially inward-facing surface.

11. The draw out circuit breaker of claim 9, wherein the shaft portion of each of the plurality of inserts is fastened by a screw to the disk plate to support the disk plate on the insulator sleeve.

12. The draw out circuit breaker of claim 8, wherein the circular disk plate is conductive has a thickness in the axial direction and a circular outer edge with a curved contour or overlap in a cross section plane parallel with the axis of the conductor, to reduce a concentration of electric field in the gap area between the conductor surface of the disk plate and the encapsulating insulator of the insulator sleeve, to thereby reduce occurrence of partial discharges in the encapsulating insulator.

13. The draw out circuit breaker of claim 8, wherein an end of a current transformer coil surrounding the conductor, which is proximate to the encapsulating insulator portion of the insulator sleeve, has a location separated by at least a minimum distance from the encapsulating insulator portion of the insulator sleeve, to thereby reduce occurrence of partial discharges in the insulator sleeve.

14. The draw out circuit breaker of claim 8, wherein a gradient in voltage in at least one of the first gap area or the second gap area is less than 14 kV per millimeter, thereby reducing occurrence of partial discharges in the insulator sleeve near the first gap or the second gap.

\* \* \* \* \*